US012047205B2

(12) United States Patent
He

(10) Patent No.: US 12,047,205 B2
(45) Date of Patent: Jul. 23, 2024

(54) SIGNAL PROCESSING DEVICE AND IMAGE DISPLAY APPARATUS INCLUDING THE SAME

(71) Applicant: LG ELECTRONICS INC., Seoul (KR)

(72) Inventor: Yecheng He, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/921,818

(22) PCT Filed: Apr. 28, 2020

(86) PCT No.: PCT/KR2020/005591
§ 371 (c)(1),
(2) Date: Oct. 27, 2022

(87) PCT Pub. No.: WO2021/221195
PCT Pub. Date: Nov. 4, 2021

(65) Prior Publication Data
US 2023/0179452 A1   Jun. 8, 2023

(51) Int. Cl.
*H04L 25/02* (2006.01)
*H04L 27/26* (2006.01)

(52) U.S. Cl.
CPC .......... *H04L 25/0262* (2013.01); *H04L 27/26* (2013.01)

(58) Field of Classification Search
CPC . H04L 25/0262; H04L 27/26; H04L 27/2601; H04L 27/2647; H04L 27/2655;
(Continued)

(56) References Cited

U.S. PATENT DOCUMENTS 6,934,327 B1 * 8/2005 Whited ................... H04L 27/22
375/225
7,558,310 B1 * 7/2009 von der Embse .... G06F 17/148
375/135
(Continued)

FOREIGN PATENT DOCUMENTS

JP         2000-324182 A       11/2000
KR    10-2013-0132952 A       12/2013
(Continued)

*Primary Examiner* — James M Perez
(74) *Attorney, Agent, or Firm* — Birch, Stewart, Kolasch & Birch, LLP

(57) ABSTRACT

The present disclosure relates to a signal processing device and an image display apparatus including the same. A signal processing device according to an embodiment of the present disclosure includes a sampler to downsample a baseband signal; a memory to store the downsampled data; a frequency shifter to read the data in the memory and shift the read data in a frequency domain; a symbol rate calculator to calculate a symbol rate based on the shifted data; a first offset calculator to calculate a first carrier frequency offset based on the calculated symbol rate; a second offset calculator to calculate a second carrier frequency offset based on the calculated first carrier frequency offset; and an offset compensator to compensate for the second carrier frequency offset. Accordingly, a time up to the demodulation completion may be shortened based on the baseband signal.

19 Claims, 12 Drawing Sheets

(58) Field of Classification Search
CPC ............ H04L 27/2657; H04L 27/2659; H04L 27/266; H04L 27/00; H04L 27/0014; H04L 27/0024; H04L 27/0026; H04L 27/003; H04L 27/0032; H04L 27/0034; H04L 27/0036; H04L 27/0038; H04L 27/004; H04L 27/0042
See application file for complete search history.

(56) References Cited

U.S. PATENT DOCUMENTS

| | | | | |
|---|---|---|---|---|
| 7,804,926 B2* | 9/2010 | Sanduleanu | H03L 7/087 | 327/159 |
| 8,170,081 B2* | 5/2012 | Forenza | H04L 25/03343 | 375/267 |
| 8,259,874 B1* | 9/2012 | Qi | H04L 27/0014 | 375/343 |
| 8,446,990 B2* | 5/2013 | Liu | H04L 27/2678 | 375/259 |
| 8,532,228 B2* | 9/2013 | Nemeth | H04L 27/2278 | 375/336 |
| 8,594,211 B2* | 11/2013 | Ahmad | H04L 27/266 | 375/260 |
| 8,879,679 B2* | 11/2014 | Quanbeck | H04L 27/2671 | 375/152 |
| 8,971,380 B2* | 3/2015 | Forenza | H04L 5/0057 | 375/267 |
| 9,270,390 B2* | 2/2016 | Gudovskiy | H04L 7/007 | |
| 9,325,554 B2* | 4/2016 | Yokokawa | H04L 25/03159 | |
| 9,572,056 B2* | 2/2017 | Hinson | H04W 24/08 | |
| 9,954,712 B1* | 4/2018 | Arambepola | H04L 5/0048 | |
| 10,009,797 B2* | 6/2018 | Zander | H04W 28/20 | |
| 10,321,450 B2* | 6/2019 | Haley | H04L 27/2657 | |
| 10,819,540 B2* | 10/2020 | Beidas | H04L 27/3863 | |
| 11,502,883 B2* | 11/2022 | Li | H04L 27/142 | |
| 2004/0039763 A1* | 2/2004 | Koizumi | H04B 1/707 | 375/E1.002 |
| 2011/0002371 A1* | 1/2011 | Forenza | H04B 17/309 | 375/227 |
| 2011/0044408 A1* | 2/2011 | Ahmad | H04L 27/2684 | 375/340 |
| 2011/0129045 A1* | 6/2011 | Tseng | H04L 27/22 | 375/344 |
| 2011/0135042 A1* | 6/2011 | Tseng | H04L 27/0014 | 375/344 |
| 2012/0014467 A1* | 1/2012 | Lindgren | H04L 27/266 | 375/260 |
| 2012/0040634 A1* | 2/2012 | Place | H03D 3/02 | 455/312 |
| 2012/0163504 A1* | 6/2012 | Nemeth | H04L 27/2278 | 375/319 |
| 2012/0189320 A1* | 7/2012 | Zelensky | H04B 10/6971 | 398/158 |
| 2012/0250750 A1* | 10/2012 | Mishra | H04L 27/0014 | 375/226 |
| 2012/0269297 A1* | 10/2012 | Mishra | H04L 27/0014 | 375/326 |
| 2013/0034130 A1* | 2/2013 | Forenza | H04B 7/0417 | 375/219 |
| 2013/0177061 A1* | 7/2013 | Ram | H04L 27/0014 | 375/226 |
| 2013/0215950 A1* | 8/2013 | Liao | H04N 21/426 | 375/225 |
| 2013/0258201 A1* | 10/2013 | Chang | H04L 27/2657 | 348/660 |
| 2014/0153920 A1* | 6/2014 | Mo | H04B 10/697 | 398/208 |
| 2014/0219666 A1* | 8/2014 | Tselniker | H04L 27/2331 | 398/208 |
| 2014/0241466 A1* | 8/2014 | Cajegas, III | H04L 27/2271 | 375/326 |
| 2015/0146806 A1* | 5/2015 | Terry | H04L 27/2626 | 375/260 |
| 2015/0172086 A1* | 6/2015 | Khoshgard | H04L 27/2646 | 375/260 |
| 2016/0192217 A1* | 6/2016 | Hinson | H04L 27/0012 | 455/67.11 |
| 2016/0205672 A1* | 7/2016 | Kim | H04L 27/2675 | 370/330 |
| 2016/0373158 A1* | 12/2016 | Ardalan | H04B 7/0413 | |
| 2017/0094562 A1* | 3/2017 | Zander | H04W 24/10 | |
| 2017/0126460 A1* | 5/2017 | Dutronc | H04L 27/2678 | |
| 2017/0180182 A1* | 6/2017 | Arditti Ilitzky | H04L 27/14 | |
| 2017/0230145 A1* | 8/2017 | Gore | H04W 52/0238 | |
| 2017/0347340 A1* | 11/2017 | Haley | H04L 25/03343 | |
| 2018/0234280 A1* | 8/2018 | Kim | H03G 5/025 | |
| 2019/0021118 A1* | 1/2019 | Tishbi | H04L 27/0006 | |
| 2019/0028322 A1* | 1/2019 | Arditti Ilitzky | H04L 27/3872 | |
| 2019/0028982 A1* | 1/2019 | Isaacs | H04W 56/001 | |
| 2019/0158335 A1* | 5/2019 | Stanciu | H04L 27/2657 | |
| 2019/0273646 A1* | 9/2019 | Liao | H04L 27/2659 | |
| 2022/0173945 A1* | 6/2022 | Li | H04L 27/0014 | |
| 2023/0179452 A1* | 6/2023 | He | H04N 5/455 | 375/225 |

FOREIGN PATENT DOCUMENTS

| | | |
|---|---|---|
| KR | 10-2018-0061239 A | 6/2018 |
| KR | 10-2019-0082546 A | 7/2019 |

* cited by examiner

SIGNAL PROCESSING DEVICE AND IMAGE DISPLAY APPARATUS INCLUDING THE SAME

CROSS REFERENCE TO RELATED APPLICATIONS

This application is the National Phase of PCT International Application No. PCT/KR2020/005591, filed on Apr. 28, 2020, all of which is hereby expressly incorporated by reference into the present application.

BACKGROUND

1. Field of the Present Disclosure

The present disclosure relates to a signal processing device and an image display apparatus including the same, and more particularly, to a signal processing device and an image display apparatus including the same which can shorten a time up to demodulation completion based on a baseband signal.

2. Description of the Related Art

A signal processing device is a device that can receive and process a baseband signal.

Such a signal processing device receives an RF signal including noise of a communication channel through an antenna, and performs signal processing for the received RF signal.

For example, while processing the signal in the signal processing device, the RF signal is converted into the baseband signal.

Meanwhile, when the received RF signal is a satellite broadcasting based RF signal, the received RF signal has a larger bandwidth than a terrestrial broadcasting based RF signal, there is a disadvantage in that the time required up to the time of the completion of the demodulation is significant.

SUMMARY

It is an object of the present disclosure to provide a signal processing device and an image display apparatus including the same which can shorten a time up to the completion of demodulation.

In accordance with an aspect of the present disclosure, the above objects can be accomplished by providing a wireless reception device and an image display apparatus including the same, including a sampler configured to downsample a baseband signal; a memory configured to store the downsampled data; a frequency shifter configured to read the data stored in the memory and shift the read data in a frequency domain; a symbol rate calculator configured to calculate a symbol rate based on the shifted data; a first offset calculator configured to calculate a first carrier frequency offset based on the calculated symbol rate; a second offset calculator configured to calculate a second carrier frequency offset based on the calculated first carrier frequency offset; and an offset compensator configured to compensate for the second carrier frequency offset.

Meanwhile, the second offset calculator may calculate a finer carrier frequency offset than the first offset calculation.

Meanwhile, the offset compensator may compensate for an offset based on the first carrier frequency offset from the first offset calculator, and the second offset calculator may calculate the second carrier frequency offset based on the compensated first carrier frequency offset.

Meanwhile, the signal processing device and the image display apparatus including the same according to an embodiment of the present disclosure may further include a filter configure to filter the data shifted by the frequency shifter, and the filter may output a filtered signal to the symbol rate calculator.

Meanwhile, the frequency shifter may repeatedly read data which is not downsampled from the memory, and perform frequency shift for the repeated read data by using different values.

Meanwhile, the symbol rate calculator may calculate a plurality of symbol rates based on a plurality of shifted data from the frequency shifter.

Meanwhile, the signal processing device and the image display apparatus including the same according to an embodiment of the present disclosure may further include a symbol rate selector selecting at least one symbol rate among the plurality of symbol rates from the symbol rate calculator, and the symbol rate selector may output the selected symbol rate to the first offset calculator.

Meanwhile, the symbol rate selector may select a symbol rate having the smallest damage of an edge component among the plurality of symbol rates which are input.

Meanwhile, the first offset calculator may calculate the first carrier frequency offset based on a frequency of the symbol rate selected by the symbol rate selector.

Meanwhile, the number of repeated reading times of the memory of the frequency shifter may increase as a range of a maximum carrier frequency offset increases.

Meanwhile, the number of repeated reading times of the memory of the frequency shifter may increase as the bandwidth of the baseband signal becomes smaller.

Meanwhile, the signal processing device and the image display apparatus including the same according to an embodiment of the present disclosure may further include a demodulation signal output device outputting the demodulation signal by completing the demodulation operation based on the second carrier frequency offset compensated by the offset compensator 950.

Meanwhile, the baseband signal may include a satellite broadcasting signal based baseband signal, and have a larger a bandwidth than a terrestrial broadcasting signal based baseband signal.

Meanwhile, after the first carrier frequency offset, or after the second carrier frequency offset, frequency shift or frequency hopping may be not performed.

Meanwhile, an operation clock frequency of the first offset calculator may be larger than the operation clock frequency of the second offset calculator.

Meanwhile, in accordance with another aspect of the present disclosure, the above objects can be accomplished by providing a wireless reception device and an image display apparatus including the same, including a frequency shifter shifting data based on the baseband signal by different values in the frequency domain, a symbol rate calculator computing a symbol rate based on the shifted data, a first offset calculator computing a first carrier frequency offset based on the calculated symbol rate, a second offset calculator computing a second carrier offset based on the calculated first carrier frequency offset, and an offset compensator compensating the second carrier offset.

Meanwhile, in order to achieve the object, the image display apparatus according to an embodiment of the present disclosure may further include a tuner configured to convert an RF signal into a baseband signal.

Effects of the Disclosure

A signal processing device and an image display apparatus according to an embodiment of the present disclosure include a sampler configured to downsample a baseband signal; a memory configured to store the downsampled data; a frequency shifter configured to read the data stored in the memory and shift the read data in a frequency domain; a symbol rate calculator configured to calculate a symbol rate based on the shifted data; a first offset calculator configured to calculate a first carrier frequency offset based on the calculated symbol rate; a second offset calculator configured to calculate a second carrier frequency offset based on the calculated first carrier frequency offset; and an offset compensator configured to compensate for the second carrier frequency offset. Accordingly, a time up to the demodulation completion may be shortened based on the baseband signal. In particular, before offset calculation and offset compensation, the time up to the demodulation completion may be shortened by performing the frequency shift.

Meanwhile, the second offset calculator may calculate a finer carrier frequency offset than the first offset calculation. Accordingly, a carrier frequency offset is coarsely calculated by using the first offset calculator and the carrier frequency offset is finely calculated by using the second offset calculator to shorten the time up to the demodulation completion.

Meanwhile, the offset compensator may compensate an offset based on the first carrier frequency offset from the first offset calculator, and the second offset calculator may calculate the second carrier frequency offset based on the compensated first carrier frequency offset. Accordingly, a time up to the demodulation completion may be shortened based on the baseband signal.

Meanwhile, the signal processing device and the image display apparatus including the same according to an embodiment of the present disclosure may further include a filter configured to filter the data shifted by the frequency shifter, and the filter may output a filtered signal to the symbol rate calculator. Accordingly, low pass filtering is performed through the filter, and the calculation and compensation of the carrier frequency offset are performed to shorten the time up to the demodulation completion.

Meanwhile, the frequency shifter may repeatedly read data which is not downsampled from the memory, and perform frequency shift for the repeated read data by using different values. The calculation and compensation of the carrier frequency offset are performed by using the frequency shift to shorten the time up to the demodulation completion.

Meanwhile, the symbol rate calculator may calculate a plurality of symbol rates based on a plurality of shifted data from the frequency shifter. The calculation and compensation of the carrier frequency offset are performed by using the continuous calculation of the plurality of symbol rates to shorten the time up to the demodulation completion.

Meanwhile, the signal processing device and the image display apparatus including the same according to an embodiment of the present disclosure may further include a symbol rate selector selecting at least one symbol rate among the plurality of symbol rates from the symbol rate calculator, and the symbol rate selector may output the selected symbol rate to the first offset calculator. The calculation and compensation of the carrier frequency offset are performed by using the selection of the symbol rate to shorten the time up to the demodulation completion.

Meanwhile, the symbol rate selector may select a symbol rate having the smallest damage of an edge component among the plurality of symbol rates which are input. The calculation and compensation of the carrier frequency offset are performed by using the selection of the symbol rate to shorten the time up to the demodulation completion.

Meanwhile, the first offset calculator may calculate the first carrier frequency offset based on a frequency of the symbol rate selected by the symbol rate selector. The calculation and compensation of the carrier frequency offset are performed by using the selection of the symbol rate to shorten the time up to the demodulation completion.

Meanwhile, the number of repeated reading times of the memory of the frequency shifter may increase as a range of a maximum carrier frequency offset increases. Accordingly, even though the number of repeated reading times of the frequency shifter is varied, subsequent continuous carrier frequency offset calculation and compensation are performed to shorten the time up to the demodulation completion.

Meanwhile, the number of repeated reading times of the memory of the frequency shifter may increase as the bandwidth of the baseband signal becomes smaller. Accordingly, even though the number of repeated reading times of the frequency shifter is varied, subsequent continuous carrier frequency offset calculation and compensation are performed to shorten the time up to the demodulation completion.

Meanwhile, the signal processing device and the image display apparatus including the same according to an embodiment of the present disclosure may further include a demodulation signal output device outputting the demodulation signal by completing the demodulation operation based on the second carrier frequency offset compensated by the offset compensator. The calculation and compensation of the first and second carrier frequency offsets are performed by using the selection of the symbol rate to shorten the time up to the demodulation completion.

Meanwhile, the baseband signal may include a satellite broadcasting signal based baseband signal, and have a larger a bandwidth than a terrestrial broadcasting signal based baseband signal. Accordingly, even with respect to the satellite broadcasting signal based baseband signal having a larger bandwidth, the calculation and compensation of the first and second carrier frequency offsets are performed by using the selection of the symbol rate to shorten the time up to the demodulation completion.

Meanwhile, after the first carrier frequency offset, or after the second carrier frequency offset, frequency shift or frequency hopping may be not performed. Accordingly, after the calculation and compensation of the frequency offset, the frequency hopping is performed and the calculation and compensation of the frequency offset according to the frequency hopping are not performed to shorten the time up to the demodulation completion.

Meanwhile, an operation clock frequency of the first offset calculator may be larger than the operation clock frequency of the second offset calculator. Accordingly, the operations of the first offset calculator and the second offset calculator are performed differently to shorten the time up to the demodulation completion.

Meanwhile, a signal processing device and an image display apparatus including the same according to another embodiment of the present disclosure include a frequency shifter shifting data based on the baseband signal by different values in the frequency domain, a symbol rate calculator computing a symbol rate based on the shifted data, a first offset calculator computing a first carrier frequency offset based on the calculated symbol rate, a second offset calculator computing a second carrier offset based on the calculated first carrier frequency offset, and an offset compensator compensating the second carrier offset. Accordingly, a time up to the demodulation completion may be shortened based on the baseband signal. In particular, before offset calculation and offset compensation, the time up to the demodulation completion may be shortened by performing the frequency shift.

Meanwhile, in order to achieve the object, the image display apparatus according to an embodiment of the present disclosure may further include a tuner configured to convert an RF signal into a baseband signal. Accordingly, the RF signal may be converted into the baseband signal and supplied to the signal processing device.

DETAILED DESCRIPTION OF THE PREFERRED EMBODIMENTS

Hereinafter, embodiments of the present disclosure will be described in further detail with reference to the accompanying drawings.

In the following description, the terms "module" and "unit", which are used herein to signify components, are merely intended to facilitate explanation of the present disclosure, and the terms do not have any distinguishable difference in meaning or role. Thus, the terms "module" and "unit" may be used interchangeably.

Figure 1:
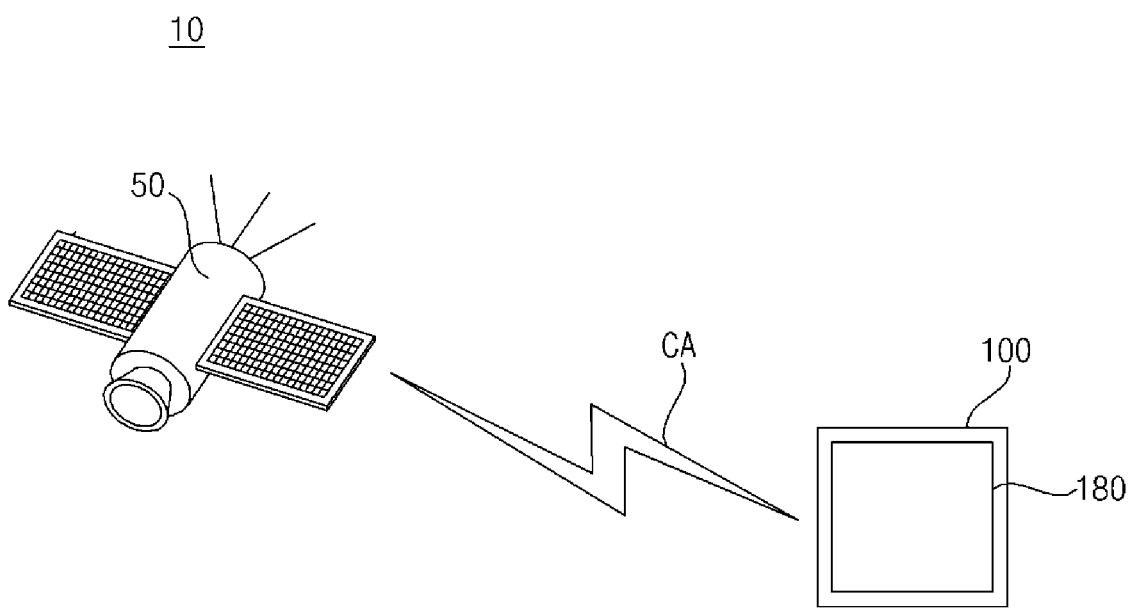
FIG. 1 is a diagram illustrating a radio frequency (RF) signal receiving system according to an embodiment of the present disclosure.

FIG. 1 is a diagram illustrating a radio frequency (RF) signal receiving system according to an embodiment of the present disclosure.

Referring to FIG. 1, an RF signal receiving system 10 according to an embodiment of the present disclosure may include the wireless signal transmitting device 50 for transmitting an RF signal CA, and the RF receiving device 100 for receiving the RF signal CA.

The RF receiving device 100 according to the embodiment of the present disclosure may be an image display device that receives a broadcasting signal, and processes the signal, and displays a broadcasting image.

Meanwhile, the wireless signal transmitting device 50 may transmit a satellite broadcasting signal.

Meanwhile, a bandwidth of a satellite broadcasting signal based baseband signal is larger than the width of a terrestrial broadcasting signal based basebend signal.

Accordingly, upon signal processing of the satellite broadcasting signal based baseband signal, in particular, demodulation, a demodulation completion time may be significantly required.

The present disclosure presents a method that may shorten the demodulation completion time upon signal processing of the satellite broadcasting signal based baseband signal, in particular, demodulation.

To this end a signal processing device 170 and an image display apparatus 100 including the same include a sampler 915 (in FIG. 9) downsampling the baseband signal, a memory 920 (in FIG. 9) storing downsampled data, a frequency shifter 925 (in FIG. 9) reading the data stored in the memory 920 (in FIG. 9) and shifting the read data in a frequency domain, a symbol rate comutator 935 (in FIG. 9) computing a symbol rate based on the shifted data, a first offset calculator 945 (in FIG. 9) computing a first carrier frequency offset based on the calculated symbol rate, a second offset calculator 960 (FIG. 9) computing a second carrier offset based on the calculated first carrier frequency offset, and an offset compensator 950 (in FIG. 9) compensating the second carrier offset. Accordingly, a time up to the demodulation completion may be shortened based on the baseband signal. In particular, before offset calculation and offset compensation, the time up to the demodulation completion may be shortened by performing the frequency shift.

Meanwhile, a signal processing device 170 and an image display apparatus 100 including the same include a frequency shifter 925 (in FIG. 9) shifting data based on the baseband signal by different values in the frequency domain, a symbol rate calculator 935 (in FIG. 9) computing a symbol rate based on the shifted data, a first offset calculator 945 (in FIG. 9) computing a first carrier frequency offset based on the calculated symbol rate, a second offset calculator 960 (FIG. 9) computing a second carrier offset based on the calculated first carrier frequency offset, and an offset compensator 950 (in FIG. 9) compensating the second carrier offset. Accordingly, a time up to the demodulation completion may be shortened based on the baseband signal. In particular, before offset calculation and offset compensation, the time up to the demodulation completion may be shortened by performing the frequency shift.

Meanwhile, in FIG. 1, the image display apparatus 100 may be a TV 100 (in FIG. 2A) or a mobile terminal 100b (in FIG. 2B) such as a cellular phone, a tablet, etc.

Figure 2A:
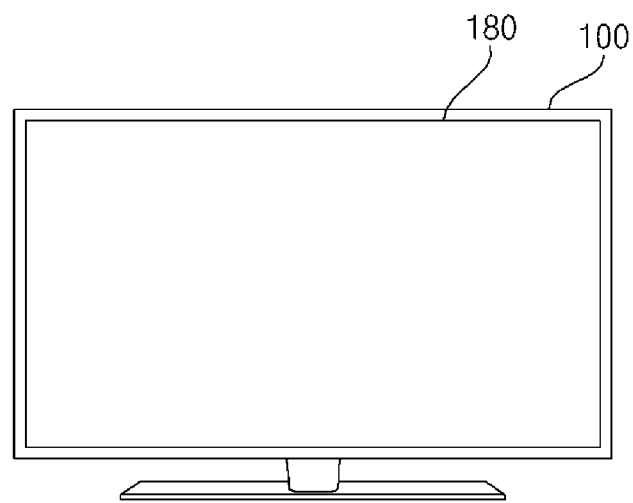
FIG. 2A is a diagram showing an example of an image display apparatus according to an embodiment of the present disclosure.

FIG. 2A is a diagram illustrating an example of an image display apparatus according to an embodiment of the present disclosure.

Referring to FIG. 2A, an image display apparatus 100 may include a display 180, and further, include the signal processing device 170 described in FIG. 1.

Accordingly, a time up to the demodulation completion may be shortened based on the baseband signal.

Figure 2B:
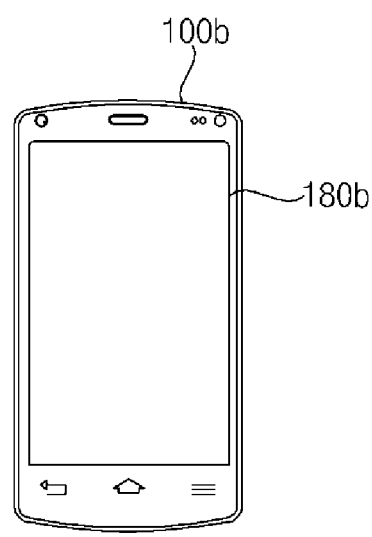
FIG. 2B is a diagram showing another example of an image display apparatus according to an embodiment of the present disclosure.

FIG. 2B is a diagram showing another example of an image display apparatus according to an embodiment of the present disclosure.

Referring to FIG. 2B, a mobile terminal 100b of FIG. 2B may include a display 180b, and further, include the signal processing device 170 described in FIG. 1.

Accordingly, a time up to the demodulation completion may be shortened based on the baseband signal.

Figure 3:
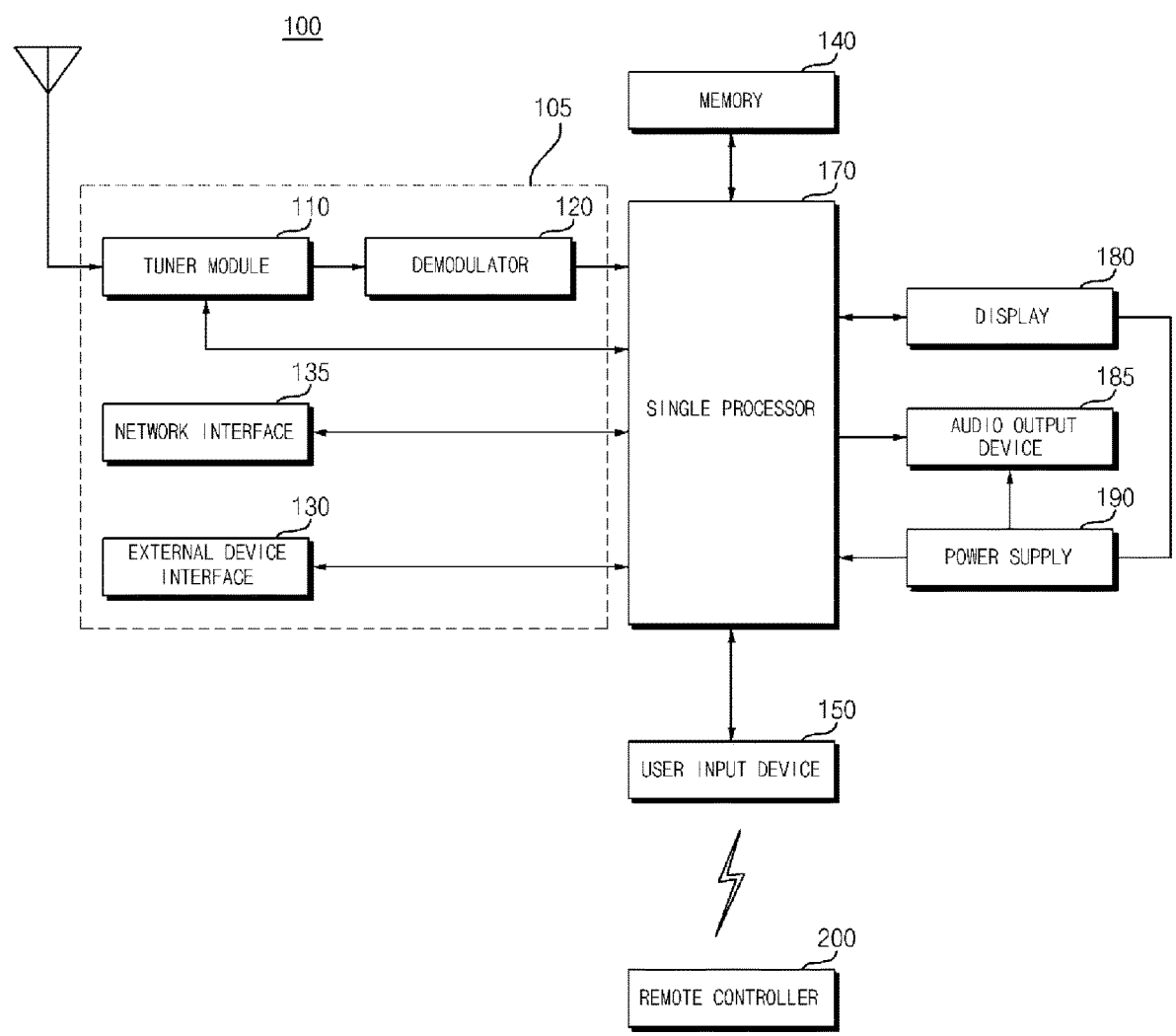
FIG. 3 is an internal block diagram of the image display apparatus of FIG. 2A.

FIG. 3 is an internal block diagram of the image display apparatus of FIG. 2A.

Referring to FIG. 3, the image display apparatus 100 according to an embodiment of the present disclosure includes a broadcast receiver 105, an external device interface 130, a memory 140, a user input interface 150, a sensor device (not shown), a controller 170, a display 180, and an audio output device 185.

The broadcast receiver 105 includes a tuner module 110, a demodulator 120, a network interface 135, and an external device interface 130.

Unlike the embodiment of FIG. 3, the demodulator 120 may be included in the tuner module 110.

Further, unlike the embodiment of FIG. 3, the broadcast receiver 105 may include only the tuner module 110, the demodulator 120, and the external interface 135, i.e., without including the network interface 135.

The tuner module 110 may tune a Radio frequency (RF) broadcast signal corresponding to a channel selected by a user or all the previously stored channels, among RF broadcast signals received via an antenna (not shown). In addition, the tuner module 110 may convert the tuned RF broadcast signal into an intermediate frequency signal or a baseband signal (baseband image signal or baseband audio signal).

For example, if the selected RF broadcast signal is a digital broadcast signal, the tuner module 110 converts the digital broadcast signal into a digital IF signal (DIF), and if the selected RF broadcast signal is an analog broadcast signal, the tuner module 110 converts the analog broadcast signal into a baseband image or an audio signal (CVBS/SIF). That is, the tuner module 110 may process the digital broadcast signal or the analog broadcast signal. The analog baseband image or the audio signal (CVBS/SIF), which is output from the tuner module 110, may be directly input to the controller 170.

The tuner module 110 may include a plurality of tuner modules to receive broadcast signals of a plurality of channels. Alternatively, the tuner module 110 may be a single turner which receives broadcast signals of a plurality of channels simultaneously.

The demodulator 120 may receive the digital IF (DIF) signal converted by the tuner module 110, and may demodulate the digital IF signal.

For example, the demodulator 120 may convert the digital IF (DIF) signal, which is converted by the tuner module 110, into a baseband signal.

Upon performing demodulation and channel decoding, the demodulator 120 may output a stream signal (TS). Here, the stream signal may be a signal obtained by multiplexing an image signal, an audio signal, or a data signal.

The stream signal, output from the demodulator 120, may be input into the controller 170. Upon performing demultiplexing, A/V signal processing, and the like, the controller 170 may output video to the display 180 and audio to the audio output device 185.

The external device interface 130 may be connected to an external device (not shown), e.g., a set-top box 50, to transmit or receive data. To this end, the external device interface 130 may include an A/V input and output device (not shown).

The external device interface 130 may be connected, wirelessly or by wire, to an external device, such as a digital versatile disk (DVD), a Blu-ray, a game console, a camera, a camcorder, a calculater (laptop calculater), a set-top box, and the like, and may perform an input/output operation with the external device.

The A/V input/output device may receive input of image and audio signals of the external device. A wireless communicator (not shown) may perform short range wireless communication with other electronic devices.

By connection with such wireless communicator (not shown), the external device interface 130 may exchange data with an adjacent mobile terminal 160. Particularly, in a mirroring mode, the external device interface 130 may receive device information, information on executed applications, application images, and the like from the mobile terminal 600.

The network interface 135 serves as an interface for connecting the image display apparatus 100 and a wired or wireless network such as the Internet. For example, the network interface 135 may receive contents or data from the Internet, a content provider, or a network operator over a network.

Further, the network interface 135 may include the wireless communicator (not shown).

The memory 140 may store programs for processing and controlling each signal by the controller 170, or may store processed video, audio, or data signals.

In addition, the memory 140 may also temporarily store video, audio, or data signals input via the external device interface 130. Furthermore, the memory 140 may store information related to a predetermined broadcast channel using a channel memory function of a channel map and the like.

While FIG. 3 illustrates an example where the memory 140 is separately provided from the controller 170, the present disclosure is not limited thereto, and the memory 140 may be included in the controller 170.

The user input interface 150 transmits a signal, input by a user, to the controller 170, or transmits a signal from the controller 170 to the user.

For example, the user input interface 150 may transmit/receive user input signals, such as a power on/off signal, a channel selection signal, a screen setting signal, and the like, to and from a remote controller 200; may transfer a user input signal, which is input from a local key (not shown), such as a power key, a channel key, a volume key, or a setting key, to the controller 170; may transfer a user input signal, which is input from a sensor device (not shown) for sensing a user's gesture, to the controller 170; or may transmit a signal from the controller 170 to the sensor device (not shown).

The controller 170 may demultiplex stream, which is input via the tuner module 110, the demodulator 120, a network interface 135, or the external interface 130, or may process the demultiplexed signals, to generate and output signals for outputting video or audio.

The video signal processed by the controller 170 may be input to the display 180 to be output as a video corresponding to the video signal. Further, the video signal processed by the controller 170 may be input to an external output device via the external device interface 130.

The audio signal processed by the controller 170 may be output to the audio output device 185. Further, the audio signal processed by the controller 170 may be input to the external output device through the external device interface 130.

Although not illustrated in FIG. 3, the controller 170 may include a demultiplexer, a video processor, and the like, which will be described later with reference to FIG. 4.

In addition, the controller 170 may control the overall operation of the image display apparatus 100. For example, the controller 170 may control the tuner module 110 to tune to an RF broadcast corresponding to a user selected channel or a pre-stored channel.

Further, the controller 170 may control the image display apparatus 100 by a user command input via the user input interface 150 or an internal program.

For example, the controller 170 may control the display 180 to display an image. In this case, the image displayed on the display 180 may be a still image or a video, or a 2D or 3D image.

In addition, the controller 170 may control the display 180 to display a predetermined object in the displayed image. For example, the object may be at least one of an accessed web screen (newspaper, magazine, etc.), an Electronic Program Guide (EPG), various menus, a widget, an icon, a still image, a video, or text.

The controller 170 may recognize a user's location based on an image captured by a capturing device (not shown). For example, the controller 170 may recognize a distance (z-axial coordinates) between the user and the image display apparatus 100. Also, the controller 170 may recognize x-axial coordinates and y-axial coordinates in the display 180 corresponding to the user's location.

The display 180 converts a video signal, a data signal, an OSD signal, a control signal which are processed by the controller 170, or a video signal, a data signal, a control signal, and the like which are received via the external device interface 130, to generate a driving signal.

Further, the display 180 may be implemented as a touch screen to be used as an input device as well as an output device.

The audio output device 185 may output sound by receiving an audio signal processed by the controller 170.

The capturing device (not shown) captures a user's image. The capturing device (not shown) may be implemented with a single camera, but is not limited thereto, and may be implemented with a plurality of cameras. The image information captured by the capturing device (not shown) may be input to the controller 170.

The controller 170 may sense a user's gesture based on the image captured by the capturing device (not shown), a signal sensed by the sensor device (not shown), or a combination thereof.

The power supply 190 may supply power throughout the image display apparatus 100. Particularly, the power supply 190 may supply power to the controller 170 which may be implemented in a form of a system on chip (SOC), the display 180 to display an image, and the audio output device 185 to output an audio.

Specifically, the power supply 190 may include a converter which converts an alternating current into a direct current, and a dc/dc converter which converts the level of the direct current.

The remote controller 200 transmits a user input to the user input interface 150. To this end, the remote controller 200 may use various communication techniques, such as Bluetooth, RF communication, IR communication, Ultra Wideband (UWB), ZigBee, and the like. Further, the remote controller 200 may receive video, audio, or data signals output from the user input interface 150, to display the signals on the remote controller 200 or output the signal thereon in the form of sound.

The above described image display apparatus 100 may be a fixed or mobile digital broadcast receiver capable of receiving digital broadcast.

The block diagram of the image display apparatus 100 illustrated in FIG. 3 is only by example. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the present disclosure and thus specific operations or devices should not be construed as limiting the scope and spirit of the present disclosure.

Figure 4:
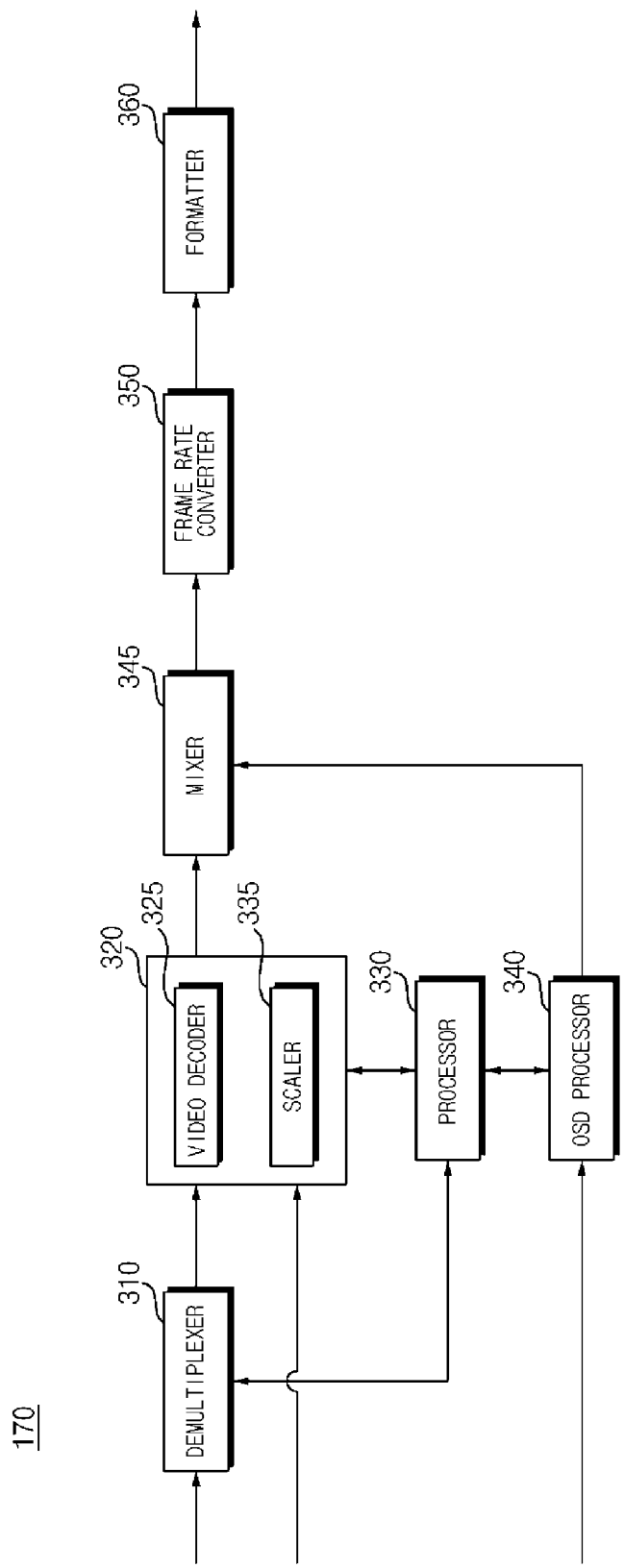
FIG. 4 is an internal block diagram of the controller of FIG. 3.

FIG. 4 is an internal block diagram of the controller of FIG. 3.

Referring to FIG. 4, the controller 170 according to an embodiment of the present disclosure includes a demultiplexer 310, a video processor 320, a processor 330, an OSD processor 340, a mixer 345, a frame rate converter 350, and a formatter 360. In addition, the processor 170 may further include an audio processor (not shown) and a data processor (not shown).

The demultiplexer 310 demultiplexes an input stream. For example, the demultiplexer 310 may demultiplex an MPEG-2 TS into a video signal, an audio signal, and a data signal. Here, the stream signal input to the demultiplexer 310 may be a stream signal output from the tuner module 110, the demodulator 120, or the external device interface 130.

The video processor 320 may process the demultiplexed video signal. To this end, the video processor 320 may include a video decoder 325 and a scaler 335.

The video processor 325 decodes the demultiplexed video signal, and the scaler 335 scales resolution of the decoded video signal so that the video signal may be displayed on the display 180.

The video decoder 325 may include decoders of various standards. Examples of the video decoder 325 may include an MPEG-2 decoder, an H.264 decoder, a 3D video decoder for decoding a color image and a depth image, a decoder for decoding an image having a plurality of viewpoints, and the like.

The processor 330 may control the overall operation of the image display apparatus 100 or the controller 170. For example, the processor 330 controls the tuner module 110 to tune to an RF signal corresponding to a channel selected by the user or a previously stored channel.

The processor 330 may control the image display apparatus 100 by a user command input through the user input interface 150 or an internal program.

Further, the processor 330 may control data transmission of the network interface 135 or the external device interface 130.

In addition, the processor 330 may control the operation of the demultiplexer 310, the video processor 320, the OSD processor 340 of the controller 170, and the like.

The OSD processor 340 generates an OSD signal autonomously or according to user input. For example, the OSD processor 340 may generate signals by which various types of information are displayed as graphics or text on the display 180 according to a user input signal. The generated OSD signal may include various data such as a User Interface (UI), various menus, widgets, icons, etc. Further, the generated OSD signal may include a 2D object or a 3D object.

The OSD processor 340 may generate a pointer which can be displayed on the display according to a pointing signal received from the remote controller 200. Particularly, such pointer may be generated by a pointing signal processor, and the OSD processor 340 may include such pointing signal processor (not shown). Alternatively, the pointing signal processor (not shown) may be provided separately from the OSD processor 340 without being included therein.

The mixer 345 may mix the OSD signal generated by the OSD processor 340 and the decoded video signal processed by the video processor 320. The mixed video signal is provided to the frame rate converter 350.

The frame rate converter (FRC) 350 may convert a frame rate of an input video. The frame rate converter 350 may output the input video as it is without converting the frame rate.

Meanwhile, the formatter 360 may change the format of the input image signal into an image signal for display on a display and output the changed format.

The formatter 360 may convert the format of a video signal. For example, the formatter 360 may convert the format of a 3D image signal into any one of various 3D formats, such as a side-by-side format, a top-down format, a frame sequential format, an interlaced format, a checker box format, and the like.

The audio processor (not shown) in the controller 170 may process the demultiplexed audio signal, or an audio signal of a predetermined content. To this end, the audio processor 370 may include various decoders.

Further, the audio processor (not shown) in the controller 170 may also adjust the bass, treble, or volume of the audio signal.

A data processor (not shown) in the controller 170 may process the demultiplexed data signal. For example, when the demultiplexed data signal is encoded, the data processor may decode the encoded demultiplexed data signal. Here, the encoded data signal may be Electronic Program Guide (EPG) information including broadcast information such as the start time and end time of a broadcast program which is broadcast through each channel.

The block diagram of the controller 170 illustrated in FIG. 4 is by example. The components of the block diagrams may be integrated or omitted, or a new component may be added according to the specifications of the controller 170.

Particularly, the frame rate converter 350 and the formatter 360 may not be included in the controller 170 but may be provided individually, or may be provided separately as one module.

Figure 5A:
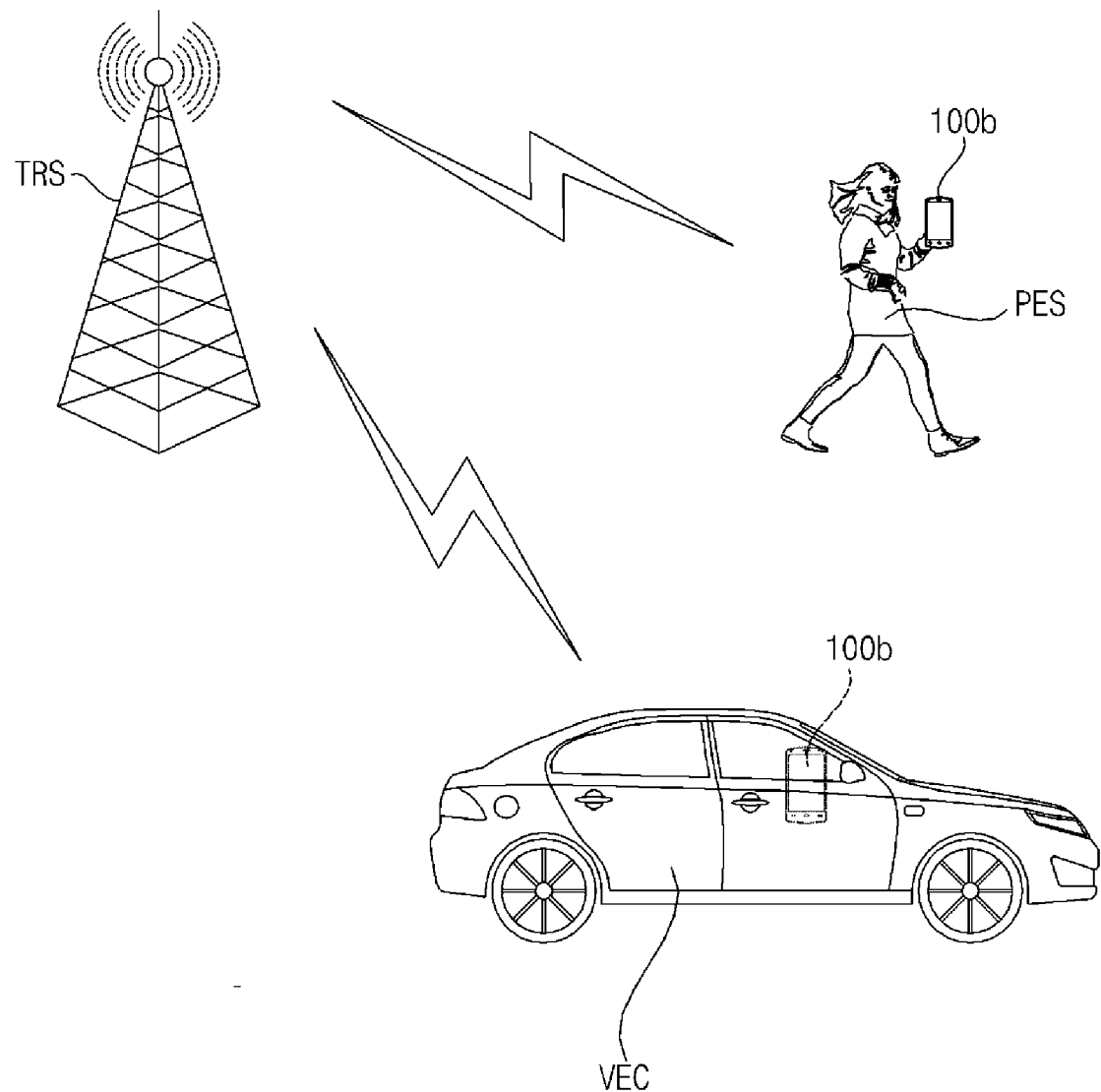
FIGS. 5A and 5B are diagrams referenced for describing an operation of an image display apparatus receiving a terrestrial broadcasting signal.
Figure 5B:
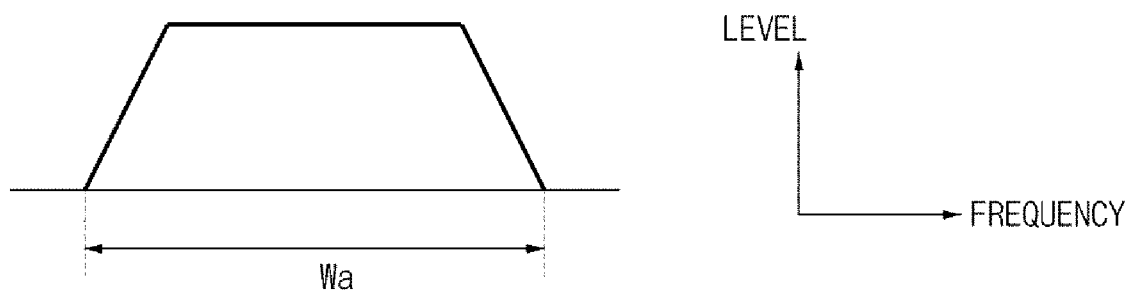

FIGS. 5A and 5B are diagrams referenced for describing an operation of an image display apparatus receiving a terrestrial broadcasting signal.

First, FIG. 5A illustrates an example in which an RF signal output from a base station TRS is received by a mobile terminal 100b of a pedestrian PES or is received by the mobile terminal 100b inside a vehicle VEC.

The RF signal output from the base station TRS may be the terrestrial broadcasting signal based RF signal.

The mobile terminal 100b of the pedestrian PES may receive the RF signal through a static channel, and the mobile terminal 100b inside the vehicle VEC may receive the RF signal through a mobile channel.

FIG. 5B is a diagram illustrating the bandwidth of the RF signal output from the base station TRS.

Referring to FIG. 5B, the RF signal output from the base station TRS may be the terrestrial broadcasting signal based RF signal, and the bandwidth of the RF signal may be Wa.

Figure 6A:
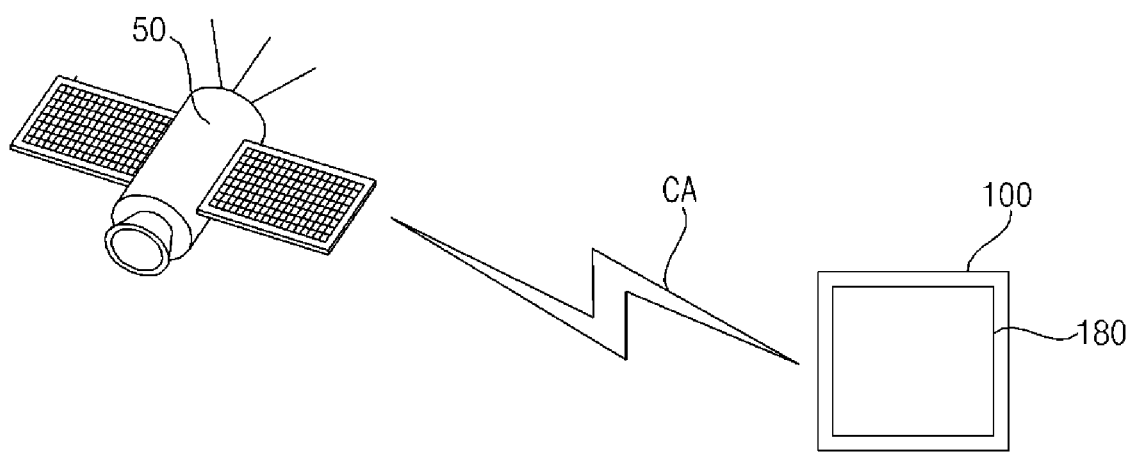
FIGS. 6A and 6B are diagrams referenced for describing an operation of an image display apparatus receiving a satellite broadcasting signal.
Figure 6B:
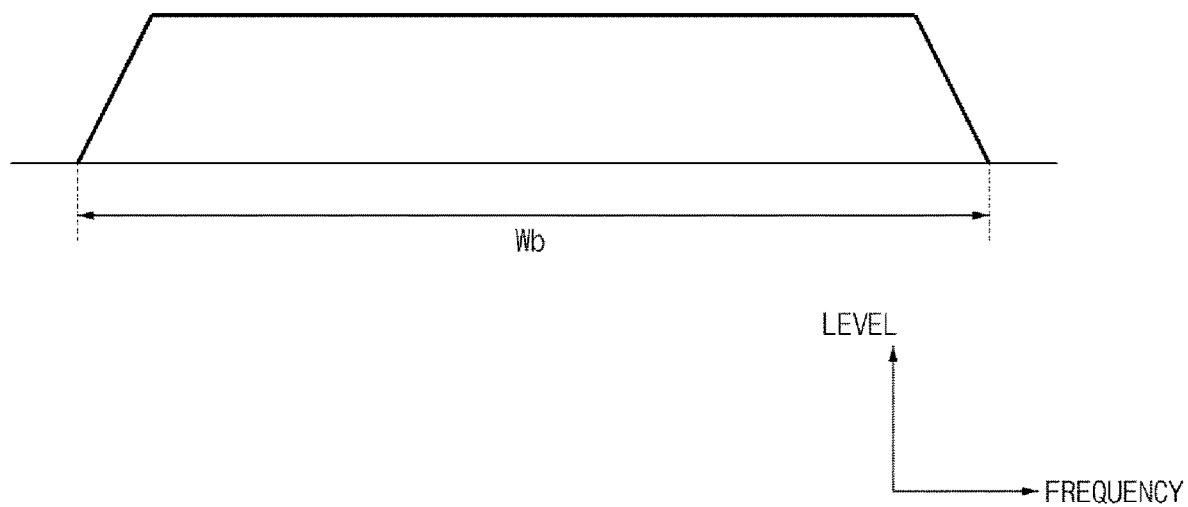

FIGS. 6A and 6B are diagrams referenced for describing an operation of an image display apparatus receiving a satellite broadcasting signal.

First, FIG. 6A illustrates that an RF signal output from a satellite 50 is received by the image display apparatus 100.

The RF signal output from the satellite 50 may be the satellite broadcasting signal based RF signal.

The image display apparatus 100 may receive the satellite broadcasting signal based RF signal.

FIG. 6B is a diagram illustrating the bandwidth of the RF signal output from the satellite 50 of FIG. 6A.

Referring to FIG. 6B, the RF signal output from the satellite 50 may be the satellite broadcasting signal based RF signal, and the bandwidth of the RF signal may be Wb.

In particular, the bandwidth Wb of the satellite broadcasting signal based RF signal is larger than the bandwidth Wa of the terrestrial broadcasting signal based RF signal.

Accordingly, when the image display apparatus 100 receives the satellite broadcasting signal based RF signal and processes the signal, a signal time is required as compared with the signal processing of the terrestrial broadcasting signal based RF signal up to the demodulation completion.

Figure 7:
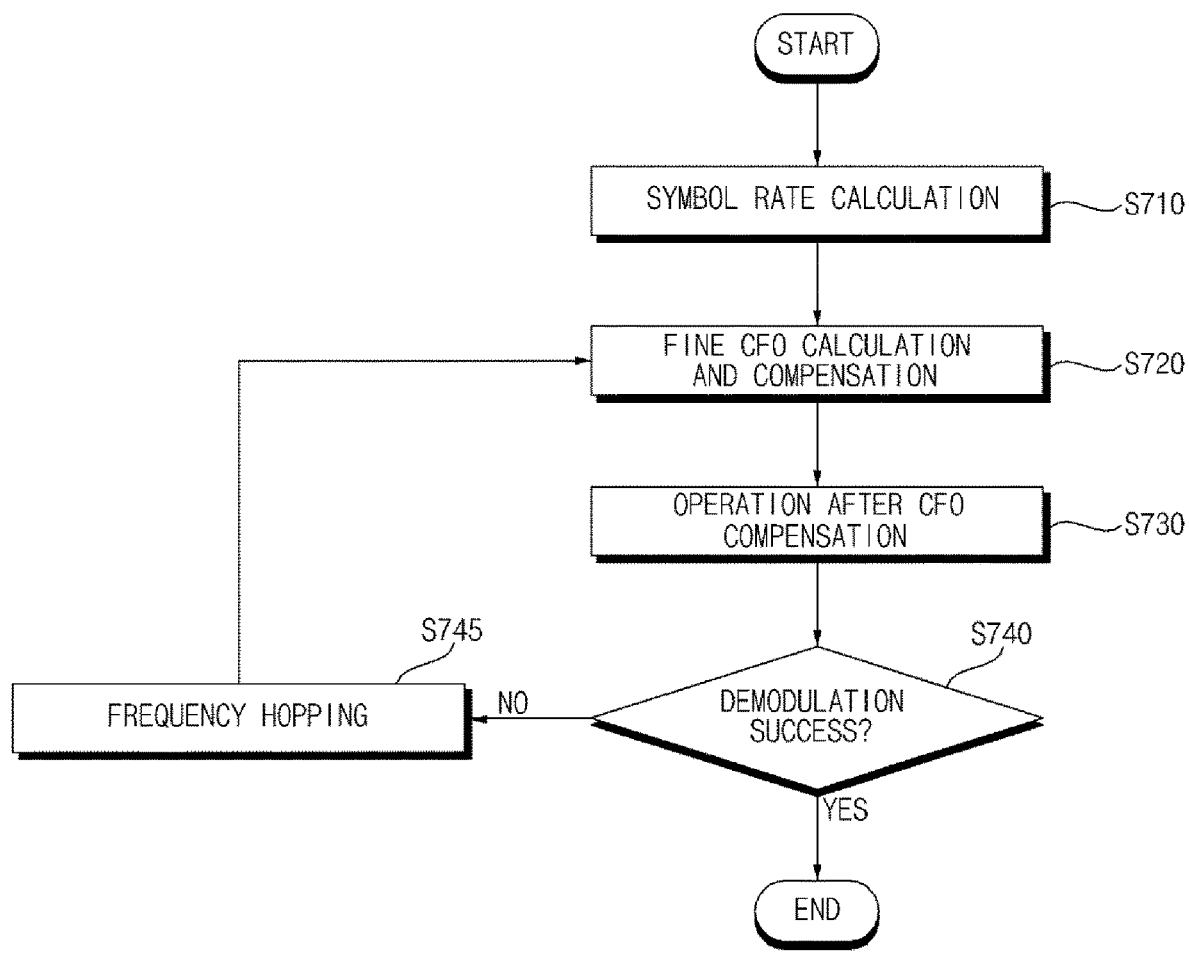
FIG. 7 is a flowchart illustrating an operation method of a signal processing device related to the present disclosure.

FIG. 7 is a flowchart illustrating an operation method of a signal processing device related to the present disclosure.

In particular, FIG. 7 is a flowchart illustrating a conventional method upon the signal processing of the satellite broadcasting signal based baseband signal.

Referring to FIG. 7, the signal processing device 170 calculates a symbol rate based on a baseband signal (S710).

The signal processing device 170 may calculate the symbol rate from the baseband signal when a satellite broadcasting signal is an OFDMA based RF signal.

In addition, the signal processing device 170 calculates and compensates a carrier frequency offset (CFO) based on the calculated symbol rate (S720).

Then, the signal processing device 170 performs demodulation processing after computing and compensating the carrier frequency offset (S730).

Then, the signal processing device 170 determines whether the demodulation is completed (S740), and when the demodulation is completed, outputs the demodulated signal, and when the signal is not demodulated, hops the frequency (S745), and calculates and compensates the carrier frequency offset in step S720.

That is, until the demodulation is completed, the frequency hopping step in step S745 is performed.

In this case, a symbol rate calculation period may be approximately 5 ms, a carrier frequency offset calculation and compensation period may be approximately 60 ms, and a demodulation processing period after the calculation and compensation of the carrier frequency offset may be approximately 80 ms.

In this case, if the number of frequency hopping times is approximately 1 to 16 times, the demodulation completion time from the baseband signal is shown as approximately 145 to 2385 ms by considering the symbol rate calculation period, the carrier frequency offset calculation and compensation period, the number of frequency hopping times, and the demodulate processing period after the calculation and compensation of the carrier frequency offset.

In particular, if the number of frequency hopping times is up to 16 times, the demodulation completion time from the baseband signal may be significantly delayed as approximately 2385 ms.

Moreover, when a size of the carrier frequency offset increases, the carrier frequency offset calculation and compensation period increases, so the demodulation completion time further exceeds approximately 2385 ms.

Therefore, the present disclosure proposes a method for shortening the time up to the demodulation completion based on the baseband signal. In particular, the present disclosure presents a method that does not perform frequency hopping after the calculation and compensation of the carrier frequency offset. This will be described with reference to FIG. 8 and below.

Figure 8:
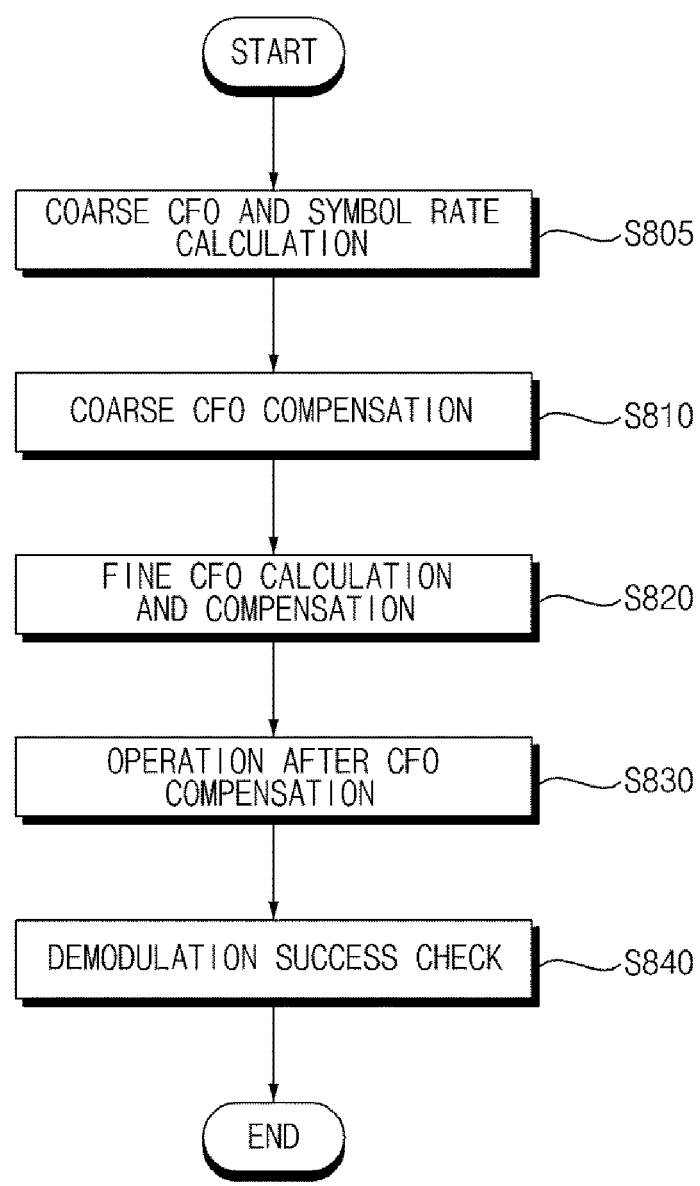
FIG. 8 is a flowchart illustrating an operation method of a signal processing device according to an embodiment of the present disclosure.

FIG. 8 is a flowchart illustrating an operation method of a signal processing device according to an exemplary embodiment of the present disclosure.

Referring to FIG. 8, a signal processing device 170 according to an embodiment of the present disclosure may receive a converted baseband signal from a tuner 110.

In this case, the baseband signal may be a baseband signal into which the satellite broadcasting signal based RF signal is converted.

In addition, the signal processing device 170 calculates a first carrier frequency offset (CFO) and a symbol rate, based on a baseband signal (S805).

In this case, the calculation of the first carrier frequency offset (CFO) as a primary carrier frequency offset calculation may correspond to a coarse carrier frequency offset calculation.

In addition, the signal processing device 170 may compensate for the first carrier frequency offset after the calculation of the first carrier frequency offset (S810).

Then, the signal processing device 170 may calculate and compensate for the second carrier frequency offset based on the compensated first carrier frequency offset (S820).

In this case, the calculation of the second carrier frequency offset as a secondary carrier frequency offset calculation may correspond to a fine carrier frequency offset calculation.

The fine carrier frequency offset calculation may perform a finer frequency offset calculation than the coarse carrier frequency offset calculation.

In addition, the signal processing device 170 may perform the demodulation processing after the calculation and compensation of the first carrier frequency offset (S830).

In addition, the signal processing device 170 may determine whether the demodulation is completed after demodulation processing, and output a demodulation signal of which demodulation is completed according to the demodulation completion (S840).

Meanwhile, in step S805, the signal processing device 170 may perform sampling in the baseband signal, store the sampled data in the memory 920, and repeatedly or continuously perform the frequency shift of the baseband signal, before performing the first carrier frequency offset calculation.

Accordingly, the first carrier frequency offset calculation may be performed, and the signal processing device 170 may select an optimal first carrier frequency offset during a plurality of subsequent first carrier frequency offset calculations, and calculate the second carrier frequency offset based on the selected first carrier frequency offset.

Consequently, as compared with FIG. 7, after the carrier frequency offset calculation and compensation, the frequency hopping step is omitted, and before step S805, while the frequency shift step is performed, the first carrier frequency offset calculation is continuously performed based on a plurality of shifted frequencies, so the time up to the demodulation completion may be shortened based on the baseband signal. In particular, before offset calculation and offset compensation, the time up to the demodulation completion may be shortened by performing the frequency shift.

Specifically, a period of storing the sampled data before step S805 in the memory 920 may be approximately 5 ms, a symbol rate calculation period may be approximately 0.8 ms, the first carrier frequency offset calculation period in step S805 and the first carrier compensation period I step S801 may be approximately 14 ms, the second carrier frequency offset calculation and compensation period in step S820 may be approximately 60 ms, and the demodulation processing period after the carrier frequency offset calculation and compensation may be approximately 80 ms.

In this case, the number of repeated reading times of the memory 920 may be approximately one time to 16 times, but unlike FIG. 7, the number of repeated reading times of the memory 920 does not a large influence on the symbol rate calculation period.

That is, since repeated reading of the memory 920 is continuously performed, the symbol rate calculation period may be approximately 0.8 ms.

Consequently, according to FIG. 8, the demodulation completion time from the baseband signal is shown as approximately 164 ms by considering a memory storage period of the sampled data, the symbol rate calculation period, the first carrier frequency offset calculation and compensation period, the second carrier frequency offset calculation and compensation period.

In particular, since the frequency hopping is omitted and the frequency shift is performed before the first carrier frequency offset calculation, the time up to the demodulation completion may be shortened.

Further, the time up to the demodulation completion in FIG. 8 is not related to the number of frequency hopping times, and is not also related to the number of reading times of the memory 920.

Further, the time up to the demodulation completion in FIG. 8 is not also related to the size of the carrier frequency offset.

Figure 9:
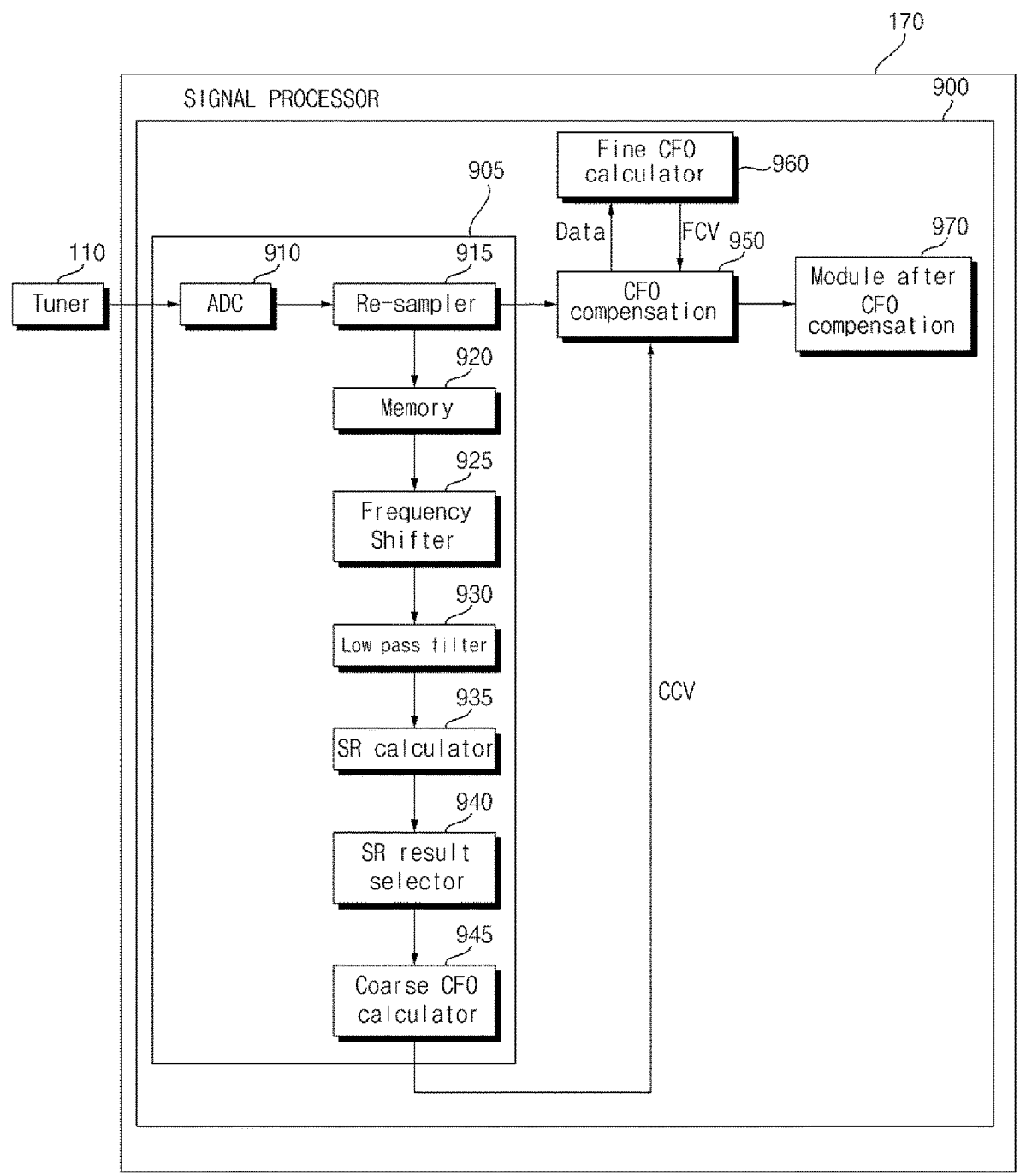
FIG. 9 is a block diagram of an internal block diagram of a signal processing device according to an embodiment of the present disclosure.

FIG. 9 is a block diagram of an internal block diagram of a signal processing device according to an exemplary embodiment of the present disclosure.

Referring to FIG. 9, an image display apparatus 100 according to an embodiment of the present disclosure may include a tuner 110 and a signal processing device 170.

In FIG. 3, it is illustrated that the demodulator 120 is disposed outside the signal processing device 170, but in FIG. 9, it is illustrated that a demodulator 900 according to an embodiment of the present disclosure is positioned inside the signal processing device 170.

The signal processing device according to an embodiment of the present disclosure may include a converter 910 that converts the baseband signal from the tuner 110 from analog to digital.

In addition, the signal processing device 170 according to an embodiment of the present disclosure includes a sampler 915 downsampling the baseband signal from the converter 910, a memory 920 storing downsampled data, a frequency shifter 925 reading the data stored in the memory 920 and shifting the read data in a frequency domain, a symbol rate calculator 935 computing a symbol rate based on the shifted data, a first offset calculator 945 computing a first carrier frequency offset based on the calculated symbol rate, a second offset calculator 960 computing a second carrier offset based on the calculated first carrier frequency offset, and an offset compensator 950 compensating the second carrier offset. Accordingly, a time up to the demodulation completion may be shortened based on the baseband signal. In particular, before offset calculation and offset compensation, the time up to the demodulation completion may be shortened by performing the frequency shift.

Meanwhile, the offset compensator 950 may compensate for the offset based on the first carrier frequency offset from the first offset compensator 945 and the second offset compensator 960 may calculate the second carrier frequency offset based on the compensated first carrier frequency offset. Accordingly, a time up to the demodulation completion may be shortened based on the baseband signal.

Meanwhile, the signal processing device 170 according to an embodiment of the present disclosure may further include a filter 930 filtering the data shifted by the frequency shifter 925, and the filter 930 may output the signal filtered by the symbol rate calculator 935. Accordingly, low pass filtering is performed through the filter 930, and the calculation and compensation of the carrier frequency offset are performed to shorten the time up to the demodulation completion.

Meanwhile, the frequency shifter 925 may repeatedly read data which is not downsampled from the memory 920, and perform frequency shift for the repeated read data by using different values.

For example, a shift value may start from 0 and increase by the unit of ⅛ of the bandwidth with both sides of − and +.

The calculation and compensation of the carrier frequency offset are performed by using the frequency shift to shorten the time up to the demodulation completion.

Meanwhile, the symbol rate calculator 935 may calculate a plurality of symbol rates based on a plurality of shifted data from the frequency shifter 925. The calculation and compensation of the carrier frequency offset are performed by using the continuous calculation of the plurality of symbol rates to shorten the time up to the demodulation completion.

Meanwhile, the signal processing device 170 according to an embodiment of the present disclosure may further include a symbol rate selector 940 selecting at least one symbol rate among the plurality of symbol rates from the symbol rate calculator 935, and the symbol rate selector 940 may output the selected symbol rate to the first offset calculator 945. The calculation and compensation of the carrier frequency offset are performed by using the selection of the symbol rate to shorten the time up to the demodulation completion.

Meanwhile, the symbol rate selector 940 may select a symbol rate having the smallest damage of an edge component among the plurality of symbol rates which are input. The calculation and compensation of the carrier frequency offset are performed by using the selection of the symbol rate to shorten the time up to the demodulation completion.

Meanwhile, the first offset calculator 945 may calculate the first carrier frequency offset based on a frequency of the symbol rate selected by the symbol rate selector 940. The calculation and compensation of the carrier frequency offset are performed by using the selection of the symbol rate to shorten the time up to the demodulation completion.

Meanwhile, the number of repeated reading times of the memory 920 of the frequency shifter 925 increases as a range of a maximum carrier frequency offset becomes larger.

Meanwhile, the number of repeated reading times of the memory 920 of the frequency shifter 925 may correspond to the number of shifts of the frequency shifter 925. For example, the number of repeated reading times of the memory 920 of the frequency shifter 925 may be approximately 16 times or 17 times.

Accordingly, even though the number of repeated reading times of the frequency shifter 925 is varied, subsequent continuous carrier frequency offset calculation and compensation are performed to shorten the time up to the demodulation completion.

Meanwhile, the number of repeated reading times of the memory 920 of the frequency shifter 925 increases as the bandwidth of the baseband signal becomes smaller. Accordingly, even though the number of repeated reading times of the frequency shifter 925 is varied, subsequent continuous carrier frequency offset calculation and compensation are performed to shorten the time up to the demodulation completion.

Meanwhile, the signal processing device 170 according to an embodiment of the present disclosure may further include a demodulation signal output device 970 outputting the demodulation signal by completing the demodulation operation based on the second carrier frequency offset compensated by the offset compensator 950. The calculation and compensation of the first and second carrier frequency offsets are performed by using the selection of the symbol rate to shorten the time up to the demodulation completion.

Meanwhile, the baseband signal may be included the satellite broadcasting signal based baseband signal.

Meanwhile, a bandwidth Wb of a satellite broadcasting signal based baseband signal is larger than the width Wa of a terrestrial broadcasting signal based baseband signal. Accordingly, even with respect to the satellite broadcasting signal based baseband signal having a larger bandwidth, the calculation and compensation of the first and second carrier frequency offsets are performed by using the selection of the symbol rate to shorten the time up to the demodulation completion.

Meanwhile, after the first carrier frequency offset, or after the second carrier frequency offset, frequency shift or frequency hopping may be not performed. Accordingly, after the calculation and compensation of the frequency offset, the frequency hopping is performed and the calculation and compensation of the frequency offset according to the frequency hopping are not performed to shorten the time up to the demodulation completion.

Meanwhile, the operation clock frequency of the first offset calculator 945 is larger than the operation clock frequency of the second offset calculator 960.

That is, the first offset calculator 945 operates at a high-speed clock frequency by using the data stored in the memory 920 and performs the operation as large as the number of times required for the sample rate calculation to calculate a first offset.

Accordingly, the operations of the first offset calculator 945 and the second offset calculator 960 are performed differently to shorten the time up to the demodulation completion.

Meanwhile, a signal processing device 170 and an image display apparatus 100 including the same according to another embodiment of the present disclosure include a frequency shifter 925 shifting data based on the baseband signal by different values in the frequency domain, a symbol rate calculator 935 computing a symbol rate based on the shifted data, a first offset calculator 945 computing a first carrier frequency offset based on the calculated symbol rate, a second offset calculator 960 computing a second carrier offset based on the calculated first carrier frequency offset, and an offset compensator 950 compensating the second carrier offset. Accordingly, a time up to the demodulation completion may be shortened based on the baseband signal. In particular, before offset calculation and offset compensation, the time up to the demodulation completion may be shortened by performing the frequency shift.

Figure 10:
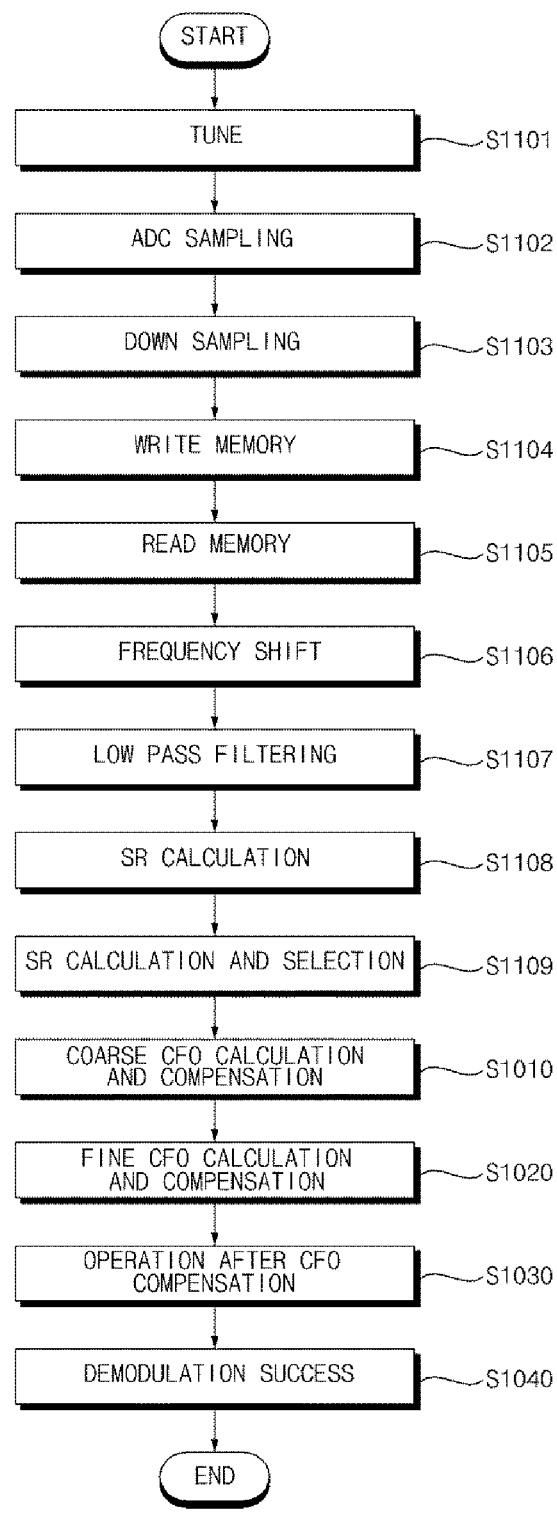
FIG. 10 is a flowchart illustrating an operation method of a signal processing device according to another embodiment of the present disclosure.
Figure 11:
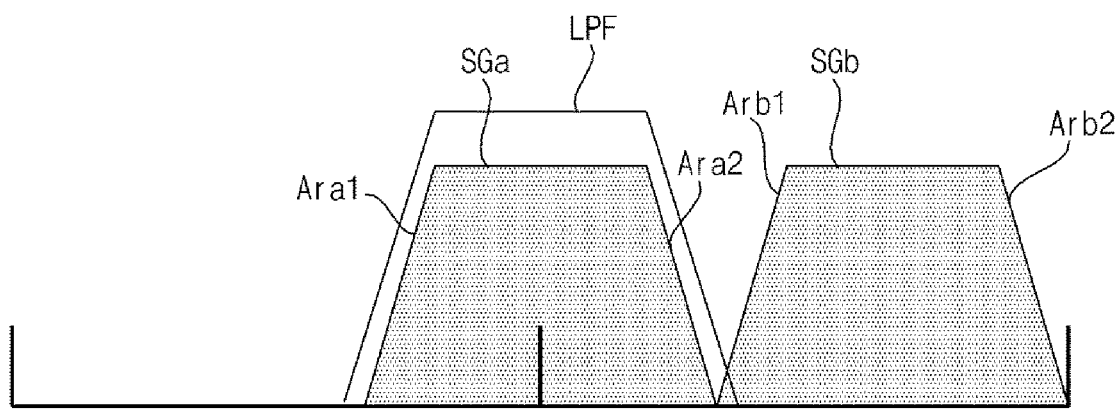
FIG. 11 is a diagram referenced for describing FIG. 10.
Figure 11:
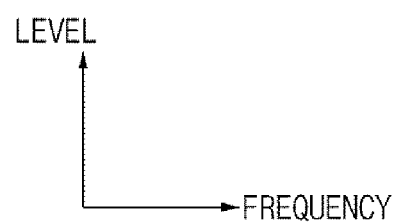

FIG. 10 is a flowchart illustrating an operation method of a signal processing device according to another embodiment of the present disclosure; and FIG. 11 is a diagram referenced for describing FIG. 10.

Referring to FIG. 10, a signal processing device 170 according to an embodiment of the present disclosure receives a converted baseband signal from a tuner 110 (S1101).

Then, the converter 910 in the signal processing device 170 converts the baseband signal from the tuner 110 from analog to digital (S1102).

Then, the sampler 915 in the signal processing device 170 downsamples the baseband signal from the converter 910 (S1103).

Then, the memory 920 in the signal processing device 170 stores the downsampled data (S1104).

Then, the frequency shifter 925 in the signal processing device 170 reads the data stored in the memory 920 (S1105), and shifts the read data in the frequency domain (S1106).

In particular, the frequency shifter 925 may repeatedly read data which is not downsampled from the memory 920, and perform frequency shift for the repeated read data by using different values.

For example, a shift value may start from 0 and increase by the unit of ⅛ of the bandwidth with both sides of − and +.

Then, the filter 930 in the signal processing device 170 may filter data shifted by the frequency shifter 925. In particular, low pass filtering may be performed.

Then, the symbol rate calculator 935 in the signal processing device 170 may calculate a plurality of symbol rates based on a plurality of shifted data from the frequency shifter 925 (S1108).

Then, the symbol rate selector 940 in the signal processing device 170 may select at least one symbol rate among the plurality of symbol rates from the symbol rate calculator 935 (S1109).

Meanwhile, the symbol rate selector 940 may select a symbol rate having the smallest damage of an edge component among the plurality of symbol rates which are input. The calculation and compensation of the carrier frequency offset are performed by using the selection of the symbol rate to shorten the time up to the demodulation completion.

FIG. 11 is a diagram illustrating a frequency spectrum of a downsampled baseband signal.

Each of a first signal SGa and a second signal SGb represents the frequency spectrum, and in particular, the second signal SGb represents the frequency spectrum when a shift value is 0 and the first signal SGa represents the frequency spectrum when the shift value is −BW.

In this case, BE may represent the bandwidth of the baseband signal.

The firs signal SGa and the second signal SGb may represent shifted frequency spectrums based on different shift values of the frequency shifter 925.

The symbol rate selector 940 may select a symbol rate having the smallest damage of an edge component among the shifted frequency spectrums. That is, the symbol rate selector 940 may select the symbol rate having the smallest damage of the edge component.

In FIG. 11, the frequency spectrum of the first signal SGa is shown, which has the smallest damage of the edge component in both edges.

Therefore, the symbol rate selector 940 may select the frequency spectrum of the first signal SGa or the symbol rate of the first signal SGa.

Then, the first offset calculator 945 in the signal processing device 170 may calculate the first carrier frequency offset based on a frequency of the symbol rate selected by the symbol rate selector 940, and the offset compensator 950 may compensate for the first carrier frequency offset (S1010).

Then, the second offset calculator 960 in the signal processing device 170 may calculate the second carrier frequency offset based on the compensated first carrier frequency offset, and the offset compensator 950 may compensate for the second carrier frequency offset (S1020).

Then, the demodulation signal output device 970 in the signal processing device 170 may complete a demodulation operation based on the second carrier frequency offset compensated by the offset compensator 950 (S1030).

Then, the demodulation signal output device 970 in the signal processing device 170 may output a modulation signal of which demodulation is completed (S1040).

The calculation and compensation of the carrier frequency offset are performed by using the selection of the frequency spectrum or the symbol rate to shorten the time up to the demodulation completion.

In particular, before offset calculation and offset compensation, the time up to the demodulation completion may be shortened by performing the frequency shift.

Meanwhile, after the first carrier frequency offset, or after the second carrier frequency offset, frequency shift or frequency hopping may be not performed. Accordingly, after the calculation and compensation of the frequency offset, the frequency hopping is performed and the calculation and compensation of the frequency offset according to the frequency hopping are not performed to shorten the time up to the demodulation completion.

Meanwhile, the operation clock frequency of the first offset calculator 945 is larger than the operation clock frequency of the second offset calculator 960. Accordingly, the operations of the first offset calculator 945 and the second offset calculator 960 are performed differently to shorten the time up to the demodulation completion.

Meanwhile, the signal processing device or the operating method of the image display apparatus according to the present disclosure may be implemented as a processor readable code in a processor readable recording medium provided in the signal processing device or the image display apparatus. The processor readable recording medium includes all kinds of recording devices storing data which may be deciphered by a processor. Further, the processor readable recording media may be stored and executed as codes which may be distributed in the calculater system connected through a network and read by the processor in a distribution method.

Further, although the embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

The present disclosure is applicable to the signaling processing device and the image display apparatus including the same.

What is claimed is:

1. A signal processing device comprising:
    a sampler configured to downsample a digital baseband signal;
    a memory configured to store the downsampled data;
    a frequency shifter configured to read the data stored in the memory and shift the read data in a frequency domain;
    a symbol rate calculator configured to calculate a symbol rate based on the shifted data;
    a first offset calculator configured to calculate a first carrier frequency offset based on the calculated symbol rate;
    a second offset calculator configured to calculate a second carrier frequency offset based on the calculated first carrier frequency offset; and
    an offset compensator configured to compensate for the second carrier frequency offset.

2. The signal processing device of claim 1, wherein the second offset calculator calculates a finer carrier frequency offset than the first offset calculator.

3. The signal processing device of claim 1, wherein the offset compensator compensates for an offset based on the first carrier frequency offset from the first offset calculator, and
    the second offset calculator calculates the second carrier frequency offset based on the compensated first carrier frequency offset.

4. The signal processing device of claim 1, further comprising:
    a filter configured to filter the data shifted by the frequency shifter,
    wherein the filter outputs a filtered signal to the symbol rate calculator.

5. The signal processing device of claim 1, wherein the frequency shifter repeatedly reads data which is not downsampled from the memory, and performs frequency shift for the repeated read data by using different values.

6. The signal processing device of claim 5, wherein the symbol rate calculator calculates a plurality of symbol rates based on a plurality of shifted data from the frequency shifter.

7. The signal processing device of claim 6, further comprising:
    a symbol rate selector configured to select at least one symbol rate among the plurality of symbol rates from the symbol rate calculator,
    wherein the symbol rate selector outputs the selected symbol rate to the first offset calculator.

8. The signal processing device of claim 7, wherein the symbol rate selector selects a symbol rate having the smallest damage of an edge component among the plurality of symbol rates which are input.

9. The signal processing device of claim 7, wherein the first offset calculator calculates the first carrier frequency offset based on a frequency of the symbol rate selected by the symbol rate selector.

10. The signal processing device of claim 5, wherein the number of repeated reading times of the memory of the frequency shifter increases as a range of a maximum carrier frequency offset increases.

11. The signal processing device of claim 5, wherein the number of repeated reading times of the memory of the frequency shifter increases as a bandwidth of the digital baseband signal decreases.

12. The signal processing device of claim 1, further comprising:
    a demodulated signal output device configured to output a demodulated signal by complementing a demodulation operation based on the second carrier frequency offset compensated by the offset compensator.

13. The signal processing device of claim 1, wherein the digital baseband signal includes a satellite broadcasting signal based digital baseband signal, and has a larger a bandwidth than a terrestrial broadcasting signal based digital baseband signal.

14. The signal processing device of claim 1, wherein after the first carrier frequency offset, or after the second carrier frequency offset, frequency shift or frequency hopping is not performed.

15. The signal processing device of claim 1, wherein an operation clock frequency of the first offset calculator is larger than the operation clock frequency of the second offset calculator.

16. An image display apparatus comprising:
    a tuner configured to convert a radio frequency (RF) signal into a digital baseband signal; and
    a signal processing device,
    wherein the signal processing device comprises:
        a sampler configured to downsample the digital baseband signal;
        a memory configured to store the downsampled data;
        a frequency shifter configured to read the data stored in the memory and shift the read data in a frequency domain;
        a symbol rate calculator configured to calculate a symbol rate based on the shifted data;
        a first offset calculator configured to calculate a first carrier frequency offset based on the calculated symbol rate;
        a second offset calculator configured to calculate a second carrier frequency offset based on the calculated first carrier frequency offset; and
        an offset compensator configured to compensate for the second carrier frequency offset.

17. The image display apparatus of claim 16, wherein the second offset calculator calculates a finer carrier frequency offset than the first offset calculator.

18. The image display apparatus of claim 16, wherein the offset compensator compensates for an offset based on the first carrier frequency offset from the first offset calculator, and
    the second offset calculator calculates the second carrier frequency offset based on the compensated first carrier frequency offset.

19. The image display apparatus of claim 16, further comprising:
    a filter configured to filter the data shifted by the frequency shifter,
    wherein the filter outputs a filtered signal to the symbol rate calculator.

* * * * *